UNITED STATES PATENT OFFICE.

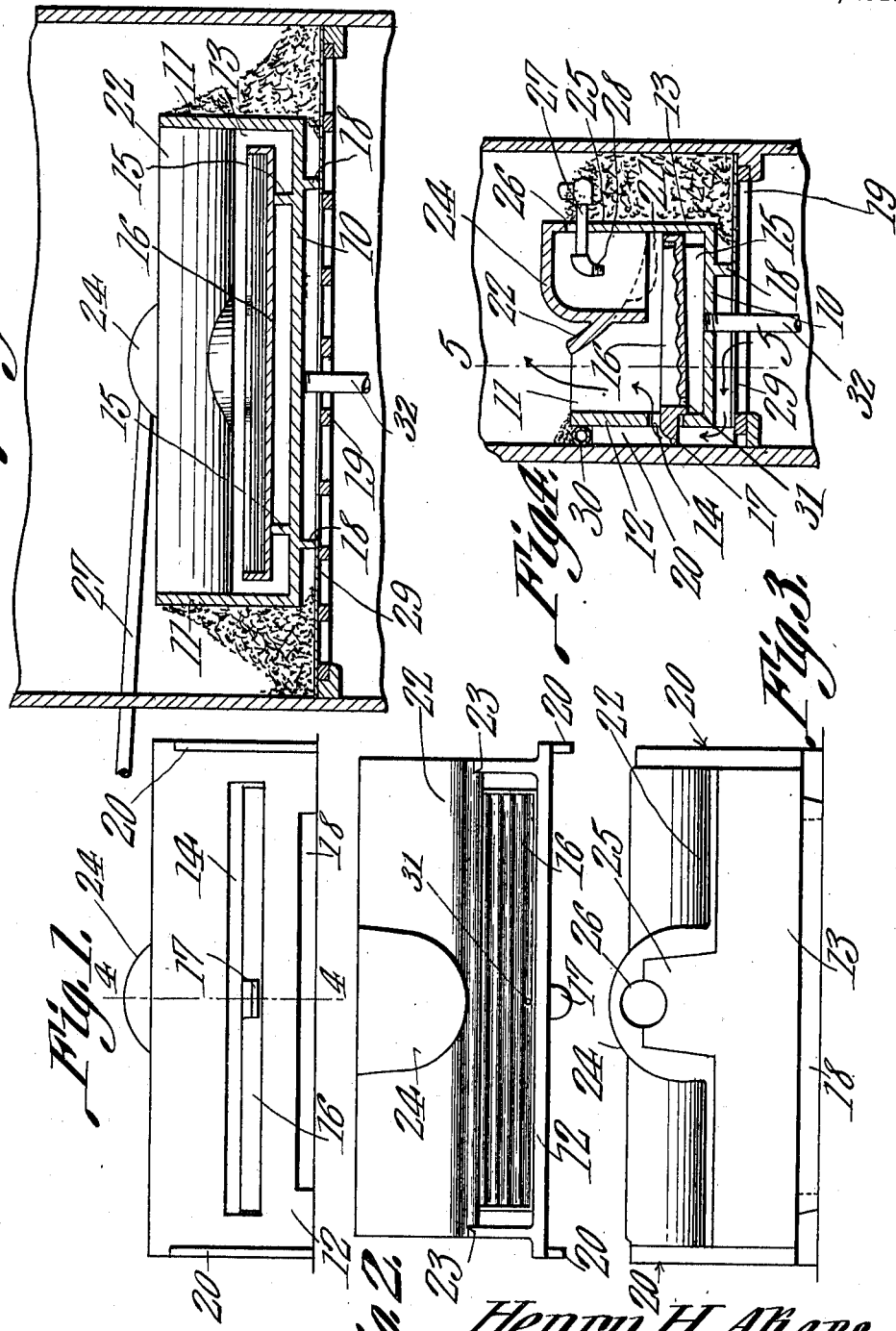

HENRY H. AKERS, OF LAMAR, MISSOURI, ASSIGNOR TO THE AKERS-RESH MANUFACTURING CO., OF SEDALIA, MISSOURI.

LIQUID-FUEL BURNER.

982,342.  Specification of Letters Patent.  Patented Jan. 24, 1911.

Application filed August 29, 1910. Serial No. 579,481.

*To all whom it may concern:*

Be it known that I, HENRY H. AKERS, a citizen of the United States, residing at Lamar, in the county of Barton and State of Missouri, have invented a new and useful Liquid-Fuel Burner, of which the following is a specification.

This invention relates to liquid fuel burners of that type in which the oil or other fuel is discharged into a heated pan in which it is vaporized, and the vapor is mixed with air to produce a highly combustible gas.

It is the object of the present invention to provide a simple and highly efficient burner of this kind embodying certain novel features of construction to be hereinafter described and claimed, the burner being adapted for cooking and heating stoves, as well as for furnaces and boilers, and, furthermore, being designed for utilizing crude or refined oils.

In order that the invention may be fully understood, reference is had to the accompanying drawing forming a part of this specification, in which drawing—

Figure 1 is a front elevation of the burner. Fig. 2 is a plan view thereof. Fig. 3 is a rear view of the burner proper. Fig. 4 is a transverse section on the line 4—4 of Fig. 1, the casing for the burner proper being also shown in section. Fig. 5 is a longitudinal section on the line 5—5 of Fig. 4.

Referring specifically to the drawing, the main body of the burner comprises a rectangular casing having a bottom 10, end walls 11, a front wall 12, and a rear wall 13. The casing is open at the top. In the front wall 12 is an air inlet opening 14. Rising from the bottom of the casing, on the inside thereof, are upstanding transverse flanges 15 which support a pan 16. The flanges are inclined so that the pan will be supported in an inclined position, the inclination being toward the air inlet opening 14. The bottom of the pan, on the inside thereof, is corrugated, as clearly shown in Fig. 4. From the front of the pan extends a short handle 17 which projects through the air inlet opening 14.

From the bottom 10 of the casing depend flanges 18 for spacing the casing from the grate 19 of the stove to which it is applied. The casing is spaced from the front wall of the stove by flanges 20 projecting from the front wall 12 at the ends thereof.

The front wall 12 of the casing is higher than the rear wall 13. The front portions of the end walls 11 have the same height as the front wall, and the rear portions of the end walls extend downwardly in a curve to meet the rear wall 13, as indicated at 21. The rear wall of the casing, and the curved portion 21 of the end walls, support a deflector comprising a concavo-convex plate 22 extending between said curved portions of the end walls. The edges of this plate which are contiguous to the end walls and the rear wall of the casing are rabbeted as indicated at 23 to receive the top edges of said walls, whereby the plate is firmly held in position thereon. The plate does not extend up to the front wall 12 of the casing, thus leaving an opening at the top of said casing through which the flames escape.

The plate 22 is formed, midway between its ends with a hood 24, opening into the casing above the rear end of the pan 16, the rear wall of the hood being recessed to receive an upstanding portion 25 of the rear wall 13 of the casing. This upstanding portion 25 is wedge shaped, as shown in Fig. 3, so that it may fit tightly in the recess. In the top edge of the upstanding portion 25 is a recess, and the opposite edge of the rear wall of the hood is also recessed, these two recesses forming a circular opening 26 through which the fuel supply pipe 27 enters the burner casing. This pipe extends into the hood 24, and terminates in a downwardly extending discharge nozzle 28, said nozzle being located so as to discharge into the rear portion of the pan 16.

In operation the oil is turned on, and permitted to drop into the pan, in which it is ignited, the oil supply first being shut off. The oil burning in the pan quickly heats the latter, so that when the oil is again turned on and allowed to drop into the pan, it will be at once vaporized upon coming in contact with the hot corrugated bottom thereof. The vapor is mixed with air entering the burner casing through the front opening 14, whereby a highly combustible gas is formed which burns fiercely with an intense heat, the flames issuing from the top of the casing through the space between the front wall 12 and the upper end of the plate 22. The corrugations on the bottom of the pan cause the oil to spread over the same more easily, which renders the vaporization of the oil more certain. It will be noted that the corrugations extend at right angles to the direction in which the pan is inclined, in view of which the oil will spread along one corrugation and overflow into the next, and so on, and thus spread over the entire bottom of the pan. The inclination of the pan gives the oil a tendency to run toward the front portion thereof.

The burner will be supported on the grate 19 of the stove as already stated, the bottom flanges 18 engaging the grate, and the front flanges 20 engaging the front wall of the stove, thus spacing the bottom of the casing from the grate, and the front wall of the casing from the front wall of the stove. The air is therefore free to flow through the grate, and upwardly along the front wall of the burner casing, and through the opening 14 thereinto, this opening being located above the pan, so that the air may mix with the vapor as already described. The opening 14 extends through the entire length of the pan so that air is fed to all parts thereof. In order that the bottom flanges 18 may have a firm bearing, a thin sheet metal plate 29 is placed on the grate, on which said flanges rest. This plate does not extend entirely over the grate, so as not to obstruct the flow of air therethrough.

The fuel supply pipe 27 extends through one of the end walls of the stove, and leads to a tank or other suitable source of supply, said tank being elevated to give a gravity feed. Inasmuch as this is a common practice, the tank has not been illustrated. If desired a force feed may be employed.

The space between the front wall 12 of the burner casing, and the front wall of the stove, is closed at the top of the casing by means of a piece of piping 30, or a rod, the same being supported by the top of the flanges 20, said flanges terminating a short distance from the top of the wall 12 so as to provide a support for the pipe or rod. In order to shut off all draft to the burner except through the air opening 14, the fire pot of the stove will be filled with ashes up to the top of the burner casing. Furnace cement will be placed on top of the pipe or rod 30 in order to tightly seal up the space between the front wall of the burner casing and the front wall of the stove. The fuel supply pipe 27, within the fire pot, will also be covered with ashes in order to protect the same from the heat of the burner. The hood 24 also affords this protection, which is important in burners using crude oils, as the oil pipe is liable to become clogged up if it gets hot.

If the burner is applied to a range or stove having an open front, the draft may enter through the front of the stove and pass directly through the opening 14 into the burner casing.

An opening 31 is formed in the bottom of the burner pan at the front thereof and leading from the bottom of the casing 10 is an overflow pipe 32. Should the fuel be fed too fast to the pan 16, the surplus amount will drain through the opening 31 and overflow through the pipe 32.

What is claimed is:

1. A liquid fuel burner comprising a casing having a bottom, a front wall having an air inlet, a rear wall, and end walls, the rear wall being lower than the front wall, and the rear portion of the end walls extending downwardly to meet said rear wall, a deflector extending between the downwardly extending portions of the end walls, and to the rear wall, the upper end of said deflector being spaced from the front wall of the casing, a pan in the casing located below the air inlet, and a fuel pipe discharging into the pan.

2. A liquid fuel burner comprising a casing having a bottom, a front wall having an air inlet, a rear wall, and end walls, the rear wall being lower than the front wall, and the rear portion of the end walls extending downwardly to meet said rear wall, a deflector extending between the downwardly extending portions of the end walls, and to the rear wall, the upper end of said deflector being spaced from the front wall of the casing, a pan in the casing located below the air inlet, a hood on the deflector opening into the casing, and a fuel pipe extending through the hood, and discharging into the pan.

In testimony that I claim the foregoing as my own, I have hereto affixed my signature in the presence of two witnesses.

HENRY H. AKERS.

Witnesses:
JACOB RESH,
W. A. EVANS.